C. WHIPPLE.
SCREW THREADING MACHINE.

No. 9,110.

4 Sheets—Sheet 1.

Patented July 6, 1852.

C. WHIPPLE.
SCREW THREADING MACHINE.

No. 9,110. Patented July 6, 1852.

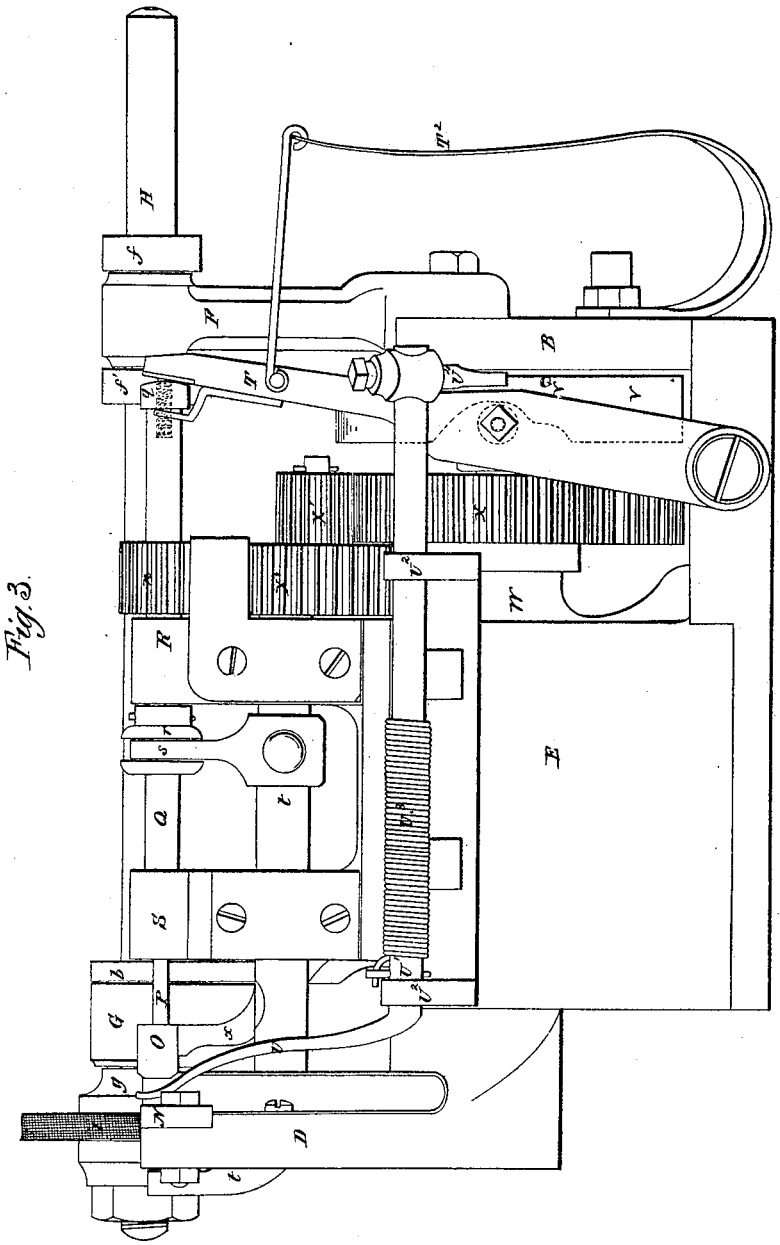

4 Sheets—Sheet 4.

C. WHIPPLE.
SCREW THREADING MACHINE.

No. 9,110. Patented July 6, 1852.

UNITED STATES PATENT OFFICE.

CULLEN WHIPPLE, OF PROVIDENCE, RHODE ISLAND, ASSIGNOR TO NEW ENGLAND SCREW COMPANY, OF PROVIDENCE, RHODE ISLAND.

SCREW-THREADING MACHINERY.

Specification of Letters Patent No. 9,110, dated July 6, 1852.

*To all whom it may concern:*

Be it known that I, CULLEN WHIPPLE, of the city and county of Providence and State of Rhode Island, have invented certain new and useful Improvements in Machinery for Threading Screws, of which the following is a full, clear, and exact description, reference being had to the annexed drawings, which make part of this specification, and in which—

Figure 1:
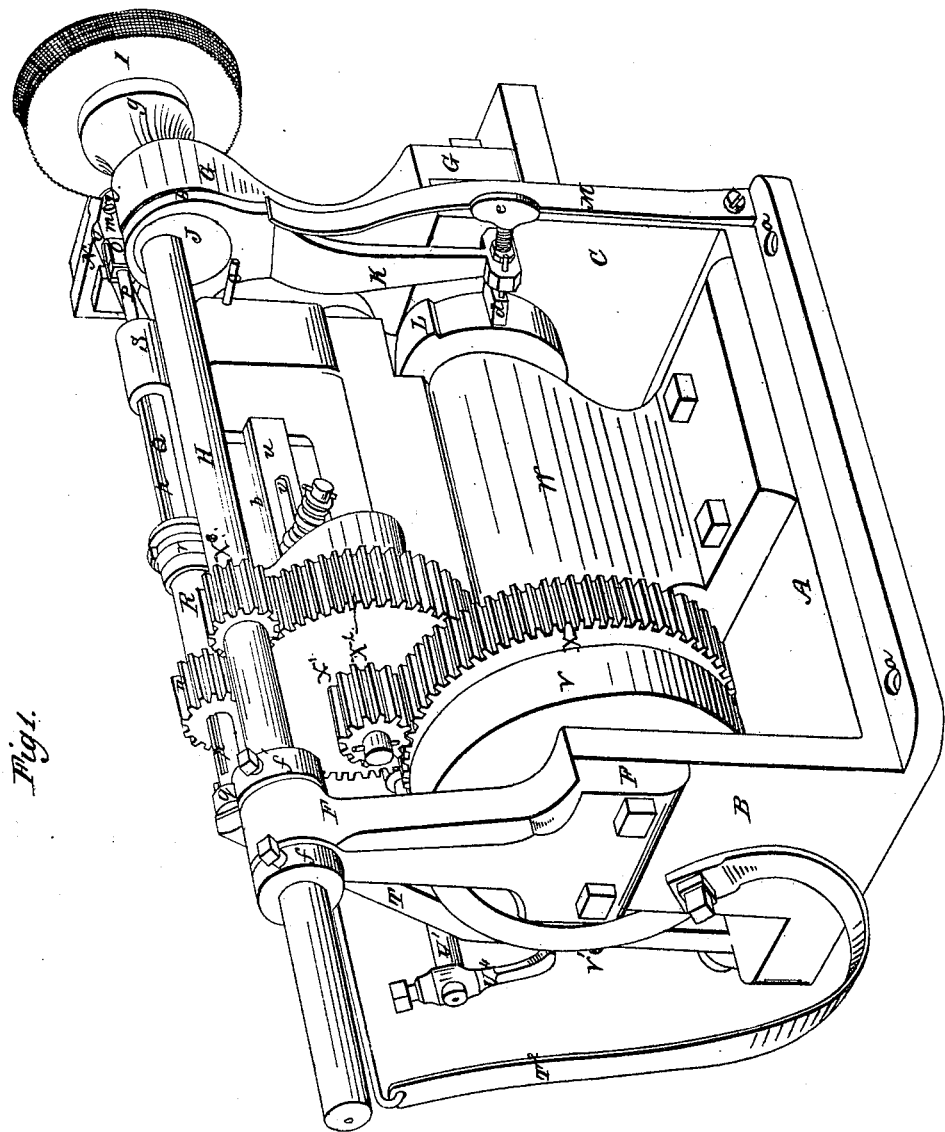
Figure 2:
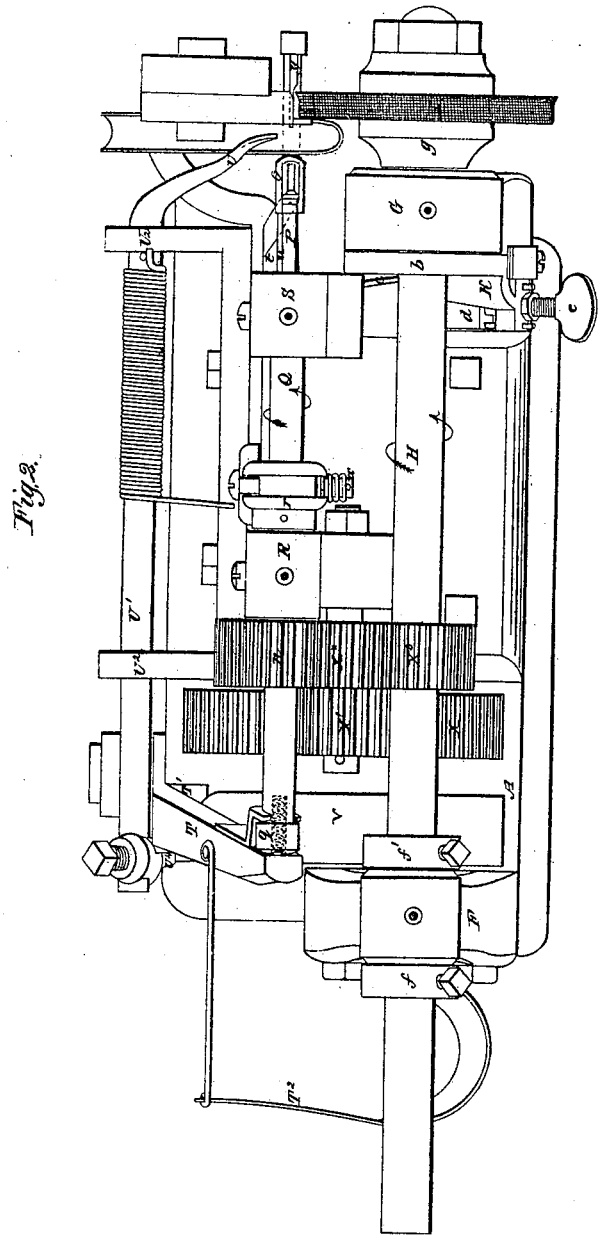
Figure 5:
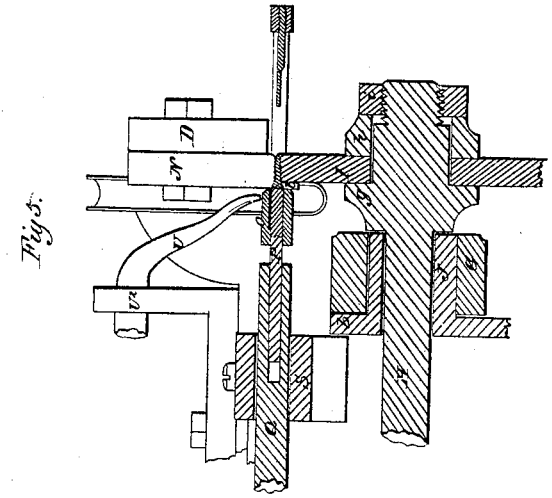
Figure 4:
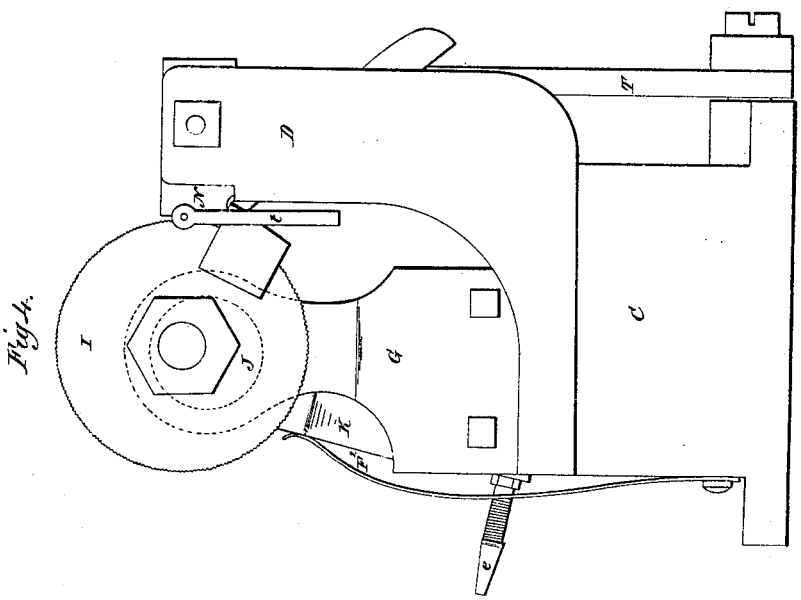

Figure 1 is a view in perspective of one of my improved machines, adapted to the manufacture of wood screws; Fig. 2, is a plan of the same; Fig. 3, is an elevation of the side of the machine opposite to that which is seen in the perspective view; Fig. 4 is an elevation of that end of the machine at which the cutter is situate; and Fig. 5 is a horizontal section taken through the axis of the cutter, the blank being threaded, and through the adjacent parts of the machine.

In my method of threading screw-blanks, it is necessary that they should receive the same previous preparation that they receive to fit them for being threaded by the machines in common use for that purpose.

In the operation of threading the points of wood-screws as heretofore practised, the axis of the point is deflected by the pressure of the chaser to a greater or less extent, as the cutting edge of the latter is dull or sharp; and this deflection gives to the point a tendency to run onto or override the chaser, which results when it takes place in either the bending of the blank, breaking off its point or otherwise damaging it so as to render it unsalable and therefor a refuse piece of metal. Difficulties of this kind constantly occur when unremitting attention is not exercised to keep the cutter adjusted at the exact position above the axis of the blank, which compensates for the deflection of the latter, in the operation of cutting, and thus prevents it from overriding the chaser; and as the distance to which the blank is deflected depends upon its rigidity, and the amount of lateral pressure against it, and as the latter depends upon the sharpness or dullness of the cutter, it will be seen that it is an exceedingly nice and difficult operation to keep the ordinary mechanism for threading the point of a wood screw, in good working order. A further difficulty in threading the point of a wood screw, arises from the point of the blank being unsupported while the cutter is acting against it, which permits a horizontal deflection of the point from the cutter which is greater or less as the shank of the screw is more or less flexible, and springs more or less toward the cutter to permit the point to bend from it, so that a compensating adjustment for the horizontal deflection, is as difficult as that for the vertical deflection.

To obviate these defects and to secure other advantages, I construct the threading cutter of my machine upon the principle of the fusee, so well known in horology, and other branches of the mechanic arts, for equalizing the strain of a spring upon clock work or other machinery, by presenting a barrel of unequal radius from which a chain is unwound by the varying tension of the spring. The fusee in its general form is the frustum of a cone or conoid, with a spiral groove or channel winding around its periphery, at such an inclination to its axis, that any point of it to which the chain is tangent, has a radius whose length is inversely as the strain of the chain at that point, so that the turning force applied to the axis of the fusee shall be equalized, however much the tension of the spring may vary.

A fusee that would rigidly fulfil these conditions would approximate the conoid in form to equalize the effect of a spring whose tension gradually varies, but it would involve the cylinder as one of the elements of its form, if by any means the tension of the spring while expanding should for one or more turns of the fusee, act upon the latter with a constant force; but as rigid theoretical exactness is not often attempted in practice, fusees of conical form are generally used. My improved cutter is a kind of irregular fusee, and as I most commonly use it, is composed of the cylinder, cone, and conoid, and instead of a smooth spiral groove or thread winding around it like the ordinary fusee, its thread is serrated, so that when turned it will cut like a saw, and if pressed while turning against a blank of smaller diameter, revolving with the same angular velocity, it will cut a screw thread on the blank, the counterpart or thereabout of the thread upon its own surface, whether the taper of the screw be straight like the sides of the conical fusee, or curved like the sides of the conoidal fusee or a compound of these inclined straight and curved lines with the parallel straight lines of the cylinder.

The next part of my invention consists in causing the axis of the fusee cutter, and the axis of the blank to rotate in the same direction during the operation of threading, in order that the metal may be cut from the grooves of the blank from the bottom outward, or from the axis toward the periphery, which prevents the chips detached from the blank by the cutter from wedging in between the two, and creating great strain and friction, as they would do, if the cut was from the periphery toward the center, which would force the chip from a wider to a narrower space, instead of forcing it from a narrower space to a wider as by this arrangement.

The next part of my invention relates to the feeding of the blanks, one at a time, and shank foremost into the rest, where they are held under the action of the cutter and threaded; and it consists of a vibrating feeding box or trough through which the screw-driver is arranged to pass and repass in moving toward and from the rest, the trough receiving one blank upon the screw driver, while the latter in its forward position is holding another to be threaded, so that when the driver is drawn to its backward position to liberate the threaded blank, the unthreaded one will drop down in front of it in the proper position to be caught on its return movement, and pushed forward into the rest to be there held and threaded.

The next part of my invention relates to the discharge of the threaded blank from the rest, and from the mechanism by which it is rotated, and it consists of a vibrating arm or the equivalent thereof, to detach the head of the screw from the driver or holder, acting in combination with a reciprocating punch to force the blank out of the rest; the combined operation of these two instruments insuring the discharge of one blank before the introduction of another, thus avoiding the danger of breaking the machine which is always imminent when an unthreaded blank is presented before the threaded one is discharged.

The next part of my invention relates to the operation of the screw driver, by which the blanks are turned while under the action of the cutter, and it consists in imparting to the bit of the screw driver, a light yielding pressure against the head of the blank, until it finds and enters the nick, and then applying to it a heavier pressure by a positive motion to keep it engaged with the blank while the latter is turned to be threaded.

The machine represented in the accompanying drawing shows one mode of applying my invention. It consists of two principal parts acting in combination—the mechanism for cutting the thread or screw upon the blank, and the mechanism for presenting blanks in succession, and in the proper manner to the cutter. These, I shall call respectively, the cutting, and the feeding-and-holding mechanisms, both of which have one common prime mover to communicate to them the proper relative motion. These combined mechanisms are supported upon a strong bed plate A made in this instance of cast iron having several standards B, C, D, E, projecting from its upper side to support at the proper height different parts of the mechanism which are secured to them. This bed plate has suitable holes $a$ made through it to receive bolts to fasten it to a strong bench, or other foundation on which it is secured when in operation. On the standards B and C puppet heads F and G are secured to support the mandrel H which carries at its front extremity the cutter I. The rear puppet-head F has a fixed bearing made in it for the back journal of the mandrel H to turn in, but the front puppet head has an aperture bored through it of considerably larger diameter than the journal of the mandrel and eccentric thereto. This aperture is fitted with a cylindrical plug J which is free to turn therein. This plug has a flange $b$ on its rear end, and is held in the puppet head by a pin $c$ which projects from a hole in the adjacent part of the frame; this cylindrical plug has an opening bored through it both parallel and eccentric to its axis, and this opening constitutes the box or bearing for the front journal of the mandrel.

An arm K extends in a downward direction from the flange $b$ of the eccentric bearing J; the lower extremity of this arm is fitted with a rubber or shoe $d$ which is adjusted by means of a screw $e$ fitted with a jam nut to hold it in any position to which it may be set. This shoe is held against a cam L by the spring M which presses on the arm K, so that as the protuberant portions of the cam press the arm K outward, the eccentric bearing in the plug J with the mandrel H will be turned inward, while as the less protuberant parts of the cam allow the spring M to press the arm K inward, the plug J will turn in such manner as to carry the mandrel outward. The rear end of the mandrel projects beyond the puppet head F, far enough to receive a belt pulley by which it is driven; and the mandrel is prevented from moving endwise by collars $f$ and $f'$ secured to it on either side of the puppet head by set screws passing through them. The front extremity of the mandrel has a solid collar $g$ formed on it with a wide shoulder to support the cutter which is clamped between this fixed collar and a movable one $h$ by a nut $i$ on the end of the mandrel. The cutter I is a kind of fusee of solid steel in this instance of about thirty times the diameter and in thickness equal to the length of the threaded portion of the shank of the screw, it is intended to cut. The center of this cutter has a cylindrical opening made through it, which is concentric with its axis, and which fits upon the mandrel between the collars. The periphery of this fusee cutter is made except in diameter, the exact counterpart in outline of the screw required to be produced by it on the shank of the blank, the spiral thread on the disk being the counterpart or thereabout in shape and of exactly the same pitch as the thread to be cut. This fusee thread is divided by oblique cuts into a series of teeth, which by revolving in contact with the shank of the screw blank reduce it to the required shape, thus forming the screw thereon. This cutter is adapted to the formation of a gimblet pointed screw with both a tapering body, and a thread tapering at both extremities. The rear end or head of this disk is the smallest in diameter and has the least cutting capacity, and this part corresponds to the upper end of the thread which is shallow, and therefore requires but little cutting action to produce it. The cutter at this end increases in diameter somewhat abruptly at first for a short distance, and then tapers gradually to near the front end or head of the disk where it again suddenly increases in diameter, so as to reduce the end of the blank to a point and thread it. Here the greatest amount of cutting action is required, and here the cutter has the greatest capacity for cutting, as its cutting power, other things being equal, is proportionate to its diameter.

A rest block N is secured to the standard D opposite to the cutter I, and barely clear of its periphery when the two are nearest together. The inner end of this block has a flange l on its rear edge, which overlaps the inner head of the cutter; between this flange and its front edge, the face of this block is transversely the counterpart in shape of the periphery of the cutter and vertically is coincident with the tangent to the periphery of the cutter. A transverse cylindrical channel m is made in that part of the face of the rest which is nearest the face of the cutter. This channel is parallel with the axis of the cutter; that portion of it which passes through the flange l is cylindrical and its rear end is countersunk to receive the head of the blank; the remainder of the channel is semicylindrical or thereabout. The cylindrical portion of the channel receives the shank of the blank, and as the two are of such relative diameters that the latter will barely turn without binding in the former, it is supported with great steadiness and firmness in the same manner as a shaft in its box.

The blanks are inserted into the rest one at a time, and shank foremost by means of a reciprocating feeding trough O and a reciprocating and rotating screw driver P which passes through the trough when it moves forward, and repasses through the trough when it moves back, so that if a blank is dropped into the trough in front of the driver when the latter is in its most backward position, it will be pushed forward from the trough O into the channel m in the rest when the driver again moves forward. A screw blank is fed into the trough O by a suitable feeder of the usual or any approved construction, every time the screw driver P is carried forward toward the rest N. This blank lies upon the stem of the screw driver while the latter remains forward so as to be ready to drop down into the bottom of the trough in front of the driver, the moment the latter is drawn back. The screw driver P is secured to the front extremity of a mandrel Q which is supported in bearings in puppet-heads R and S secured to the standard E. The rear end of this mandrel projects beyond the puppet head S, through a pinion n in the eye of which is a feather that enters a longitudinal groove p on the mandrel, by which arrangement the mandrel may slide freely through the eye of the pinion, while neither can turn without rotating the other. This arrangement allows the screw driver while being continuously rotated by the pinion to be alternately moved from and toward the rest, to discharge a threaded blank and present an unthreaded one.

The rear extremity of the mandrel Q has a collar q formed on it which turns between the forks at the upper extremity of a lever T. This collar is rather narrower than the space between the forks of the lever T so as to allow the mandrel, a little end-play. A spring shown in red lines in Fig. 3, is inserted in a socket formed in the end of the mandrel, which bears against the rear limb of the fork, and constantly presses the collar q toward the front limb thereof. The object of this spring is to allow the screw driver to yield slightly when first pressed against the head of a screw blank to enable the bit with the greater facility to find and enter the nick, and to avoid the bruising of the head which results when a screw driver rigidly held, is pressed with a motion wholly positive while turning against the head of a blank in a fixed and solid rest. The front extremity of the screw driver P passes through the trough O, and out at its front end, when in its most forward position, as seen in Fig. 5 and when in its most backward position as seen in red lines in the same figure, it is withdrawn into a socket in the rear end of the trough. The bit of the screw driver should be of the proper size to enter the nick in the heads of the blanks.

On that portion of the mandrel Q, between the puppet heads, a grooved collar $r$, is secured, which embraces the arm $s$ that projects up from a bar $t$; the latter slides in bearings in the legs of the puppet-heads R and S, so as to move parallel to the mandrel Q. By the side of the bar $t$ and in the same bearings another sliding bar, $u$ is placed; the two bars are of uniform breadth and thickness, and their adjacent sides fit smoothly together. The bar $u$ has a longitudinal slot $v$ made in it through which a round arm $w$ projects from the bar $t$. This arm has a spiral spring coiled around it, which at one end bears against a washer, which slides against the bar $u$, and at the other end presses against a pin in the outer end of the arm $w$, so that the bars $u$ and $t$ are clamped together with a force equal to the tension of the spring. The object for which these bars are thus clamped together, is that the bar $t$ may when moved back and forth by the collar $r$, carry with it the bar $u$ by friction, until the latter is arrested by a stop, while the former is free to move on. The front end of the bar $u$ has a standard $x$ projecting up from it, which carries the feed trough O, and as the motion of the latter is more limited in its range in both directions than the screw driver, the movement of the driver carries the trough back or forward by sliding the two bars $u$ and $t$ together, until the trough strikes a stop, when the bar $u$ is arrested; but the bar $t$ slides on until the screw driver has attained the extremity of its range of motion.

The bar $t$ extends forward beyond the standard D, and is then bent upward to the proper height to support a punch $y$ whose axis is in line with the axis of the cylindrical channel $m$ in the rest. Whenever the screw driver is drawn backward, the punch $y$ will also be drawn back. The end of the punch is placed at such a distance in advance of the rest that it does not enter the groove $m$ to push back the threaded screw, until the screw driver and trough have moved back far enough to give room for the free discharge of the screw. When the screw driver moves forward it carries the discharge punch with it, which is moved out of the front end of the groove $m$, before the blank enters its rear end.

To prevent the adhesion of the head of the screw to the bit of the driver a vibrating arm U is arranged at the side of the rest N and is suddenly depressed at the instant the screw driver is passing into the trough O, so as to strike the screw and detach it from the driver. This arm projects upward from a shaft U′ which is supported in bearings formed in brackets $U^2$. A spring $U^3$ is secured on the shaft U′ which constantly presses the arm U outward from the screw driver. On the rear end of the shaft U′ a second arm $U^4$ projects downward against the periphery of a cam V on which a tappet or pin V′ projects, which strikes the arm $U^4$ and turns it suddenly outward, once at each revolution of the cam. This movement outward of the arm $U^4$ turns the end of the arm U, suddenly in toward the screw driver to detach the blank.

The cams L and V are mounted upon the opposite extremities of a shaft, supported in a long bearing in a puppet head W secured by bolts to the bed-plate A. Between the cam V and the rear end of the puppet head, a cog-wheel X is secured to the cam shaft. This cog wheel receives motion from a pinion X′ on a counter shaft above it, and this pinion is connected with, and moved by a wheel $X^2$, which is driven by a pinion $X^3$ secured to, and turned by the mandrel H of the cutter. The wheel $X^2$ gears into and drives the pinion $n$ on the mandrel of the screw driver which pinion is of equal diameter with the pinion $X^3$ so that the pinions $X^3$ and $n$ will at all times turn with equal velocity to rotate the blank and the cutter simultaneously with equal speed and in equal times.

The cam V has a narrow ring formed on the outer edge of its front side against which a shoe or arm T′ projecting from the inner side of the lever T, bears. This ring on the cam for about ten twelfths of its circumference is parallel to its plane of rotation, and therefore does not move the lever T. About two twelfths of this ring are depressed into the face of the cam to allow the lever T to be drawn back by the spring $T^2$ for the purpose of moving the screw driver back, to discharge a threaded blank, and to bring an unthreaded blank into range with the rest, ready to be pushed forward on the return of the screw driver. This depression in the ring of the cam, has both its ends inclined; the inclination at that end of the depression which allows the screw driver to fall back, has a step in it which causes the driver to stop for a moment about the middle of its backward movement, while the arm U strikes to detach the screw.

The inclination at that end of the depression, which causes the screw driver to move forward is gradual so that the bit of the driver may have time to find and engage with the nick in the head of the blank before it is pressed forward by the flat portion of the ring on the face of the cam with the requisite force to hold and turn the blank under the action of the cutter. This depression in the cam V is shown in red lines in Fig. 3.

The cam L on the front end of the cam shaft is turned simultaneously with the cam V. The acting portion of this cam is its periphery, which for about nine twelfths of its circumference is eccentric to its axis; for about one twelfth more of its circumference it is concentric at its most protuberant part with its axis, and for the remaining two twelfths of its circumference, it is concentric at the least protuberant part with its axis.

The concentric portion of the least protuberant part of the cam corresponds to the depression of the two twelfths of the acting ring face of the cam V, so that while the screw driver is kept in its backward position by the latter cam, the cutter wheel is held for the former cam at its greatest distance from the rest, and when the cam V has forced the screw driver forward, and with it a blank into the channel $m$ of the rest, the cam L at the commencement of its eccentricity at the least protuberant point, begins to push the lower end of the arm K gradually outward, and moves the cutter gradually toward the blank which it begins to cut. As the cam continues to turn, the radius of its surface acting against the lever gradually increases and presses the cutter nearer and nearer toward the axis of the blank, until the cam has made nine twelfths of a revolution, when the thread of the screw will be cut to the required depth. As the cam turns during the next one twelfth of a revolution the cutter will not approach any nearer to the axis of the blank, but will repass over the cut it had previously made to remove any protuberance that might have been left, to render the screw smoother and give it a better finish. When this is accomplished, the radius of the cam which acts upon the lever K is contracted by a sudden step to its shortest limit to permit the cutter to fall back, and allow the threaded blank to be discharged and another unthreaded one to be presented, which is in turn threaded by a repetition of the before described operations.

While the cams L and V are making one revolution, the cutter and the blank make ten revolutions in contact, and the cutter makes two revolutions while the blank is being inserted and discharged. As the surface motion of the cutter is about thirty times greater than the surface motion of the blank, it acts upon the latter and cuts it in the same manner that a saw or file would act upon a fixed piece of metal held in a vise, and will remove the surplus metal by a drawing cut, and this drawing action will be greater as the diameter of the cutter is greater than that of the blank.

As the adjacent portions of the peripheries of the blank and cutter move in opposite directions, the teeth of the latter cut from the bottom of the groove in the blank outward, or from the axis toward the circumference, so that the chips always pass from a narrow into a wider space, which causes the tool to clear itself with great ease.

What I claim as my invention and desire to secure by Letters Patent is—

1. A fusee threading cutter for threading screw blanks, substantially as herein set forth.

2. I also claim the arrangement of the cutter and blank in such manner that the adjacent portions of their peripheries shall move in opposite directions during the operation of threading, so that the metal may be cut from the grooves in the blank from the bottom outward to allow the chip to be freely discharged, substantially as herein set forth.

3. I also claim the combination of the vibrating feeding trough and screw driver arranged in such manner that when the driver is pushed forward to turn a blank while being threaded, an unthreaded blank may lie in the trough upon the driver, ready to drop into place before it the instant it is drawn back to allow the previous blank to be withdrawn from the cutter.

4. I also claim the combination of the vibrating arm or its equivalent to detach the head of a threaded blank from the bit of the screw driver, with a discharging punch or its equivalent to eject the threaded blank from the rest, the two thus operating insuring the discharge of one blank before another is presented.

5. I claim a spring or the equivalent thereof in the mandrel of the screw driver, substantially as herein set forth to impart to the bit of the screw driver a slight yielding pressure against the head of the blank until it finds and enters the nick thereof, in combination with the lever and cam which afterward apply to the driver a positive motion to keep it engaged with the blank while the latter is turned to be threaded, substantially as described.

In testimony whereof I have hereunto subscribed my name.

CULLEN WHIPPLE.

Witnesses:
F. G. FONTAINE,
P. H. WATSON.